L. & G. GANS.
AUTOMOBILE ACCESSORY.
APPLICATION FILED MAY 2, 1910.
985,338.
Patented Feb. 28, 1911.
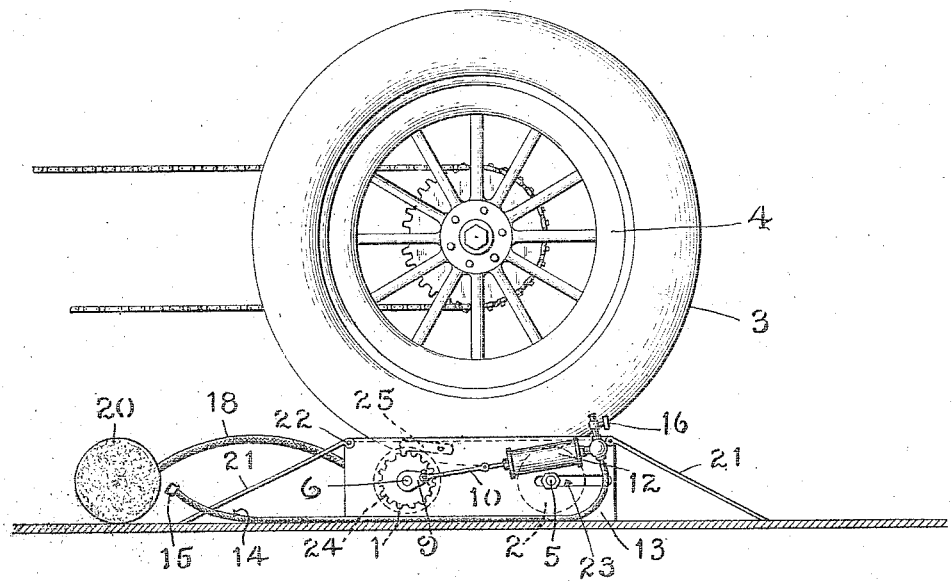
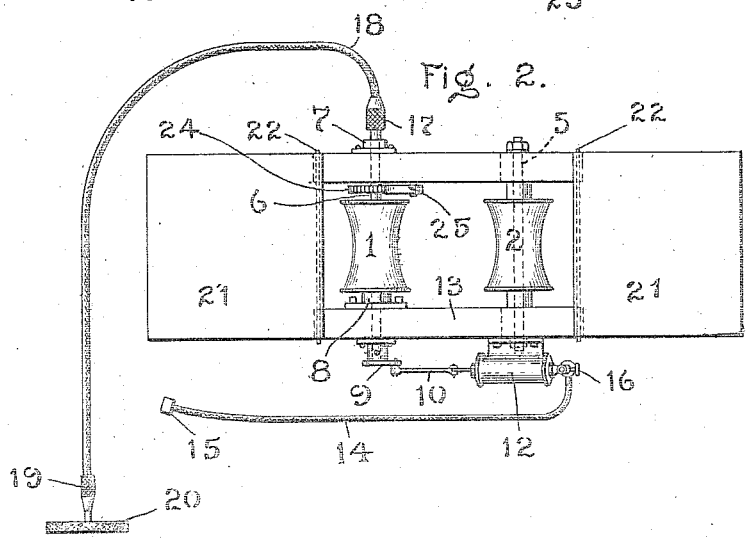
Witnesses:—
Inventors
Louis Gans.
Gus Gans.

UNITED STATES PATENT OFFICE.

LOUIS GANS AND GUS GANS, OF LOS ANGELES, CALIFORNIA.

AUTOMOBILE ACCESSORY.

985,338.

Specification of Letters Patent.　Patented Feb. 28, 1911.

Application filed May 2, 1910. Serial No. 559,028.

*To all whom it may concern:*

Be it known that we, LOUIS GANS and GUS GANS, citizens of the United States, residing at Los Angeles, county of Los Angeles, and State of California, have invented a new and useful Automobile Accessory, of which the following is a specification.

This invention relates to an automobile accessory and the main objects of the invention are to provide a convenient device for compressing air for inflating the tires of an automobile or for operating a tool, the device being driven by friction from one of the driving wheels of the automobile.

In the drawing: Figure 1 is a side elevation of the device showing it in position for use, with the automobile driving wheel resting in operative position on the device. Fig. 2 is a plan view of the device.

The invention comprises a pair of rollers 1 and 2 which are preferably formed with concave peripheries as shown, to fit the large rubber tire 3 of one of the driving wheels 4 of the automobile. The wheel 2 is journaled on the shaft 5 and rotates freely thereon while the wheel 1 is rigidly secured to a shaft 6, the latter being mounted to rotate in bearings 7 and 8. On one end of the shaft 6 is a crank 9 which operates a connecting rod 10, the latter operating an air pump 12 which is secured to the frame 13 and is provided with a tube 14, the latter having a connection 15 for coupling to the valve stem of the tire which is to be inflated. 16 is a valve, which, when opened permits the air compressed in the pump 12 to issue directly into the atmosphere as clearly shown in Fig. 1. When the valve 16 is closed the air is forced through the pipe 14. On the other end of the shaft 6 is a chuck 17 which may hold any tool which it is desired to operate with the device or it may hold a flexible shaft 18 and the latter, in turn, may have a chuck 19 in which any suitable tool may be held. In the drawings we have shown a grinding or polishing wheel 20.

21 designates plates hinged at 22 to the frame 13, and which, when opened out as shown in Figs. 1 and 2, form inclined approaches up which the wheel of the automobile may easily travel into position over the rollers 1 and 2 or out of operative position over them. The plates 21 may be folded over the top of the frame 13, as indicated by dotted lines in Fig. 1, when the device is not in use, and the device may thus be arranged in compact form and easily carried in the automobile.

The shaft 5 is adjustable horizontally in slots 23 which enable the exact positioning of the wheel 2 so that the device will operate with automobile driving wheels of various diameters.

When it becomes necessary to inflate a tire, the device is placed on the road, the plates 21 are opened out and the automobile is run in a direction to cause one of its driving wheels to roll up on one of the plates 21 and into position on top of the wheels 1 and 2. The other driving wheel of the automobile will rest upon the roadbed. Upon operating the regular propelling gear of the automobile, the driving wheel which rests upon the wheels 1 and 2 will be rotated, while the other driving wheel is held from rotating by its contact with the roadbed, the automobile meanwhile standing still, and as the automobile driving wheel which rests upon the wheels 1 and 2 is thus rotated, it revolves the wheels 1 and 2 by friction and the pump 12 is thus operated from the rotating wheel 1, and air is pumped through the pipe 14 and the coupling 15 having been connected with the tire which is to be inflated, compressed air is pumped into the tire without requiring any exertion on the part of the operator of the automobile other than to place the device in position and make the necessary connections, the actual labor of inflating the tire being performed by the engine of the automobile. When the necessary pressure has been produced, the valve 16 may be quickly opened to permit air to escape directly from the air pump without being forced into the tire. This is a very convenient and simple method of stopping the process of inflation as compared with stopping the engine or throwing out the driving gears, although such could be done if desired. It is very simple to turn the valve 16 on and off until the exact pressure in the tire has been produced while the engine of the automobile may operate continuously during the process until the tire is inflated to the exact pressure desired. In addition to the advantages secured by operating the air pump in this manner, there is the further advantage which may be derived from the invention through the medium of the tool which may be operated from the other end of the shaft 6. The tool thus operated may be of any kind wherein a rotary motion is required for its operation.

After the tire has been inflated and it is desired to run the automobile wheel off from the wheels 1 and 2, it is obvious that one of the wheels 1 and 2 must be prevented from rotating; otherwise the automobile wheel would not ride off. To this end we provide a toothed wheel 24 secured rigidly to the shaft 6 and a pawl 25 may be dropped into engagement with the toothed wheel to prevent rotation thereof and thereby hold the wheel 1 stationary to permit the automobile wheel to ride off. The plates 21 may then be folded up and the device packed away in the automobile.

What we claim is:

An automobile accessory comprising a frame having a slot in each side thereof, a shaft extending through said slot and adjustably secured in position, another shaft rotatably mounted in said frame, a wheel rotatable on the first shaft, another wheel fixed on the second shaft, both of said wheels adapted to support and be operated by the driving wheel of an automobile, and an air pump operated by one of said wheels.

In testimony whereof, we have hereunto set our hands at Los Angeles, California, this 26th day of April 1910.

LOUIS GANS.
GUS GANS.

In presence of—
G. T. HACKLEY,
FRANK L. A. GRAHAM.